US012649579B2

(12) United States Patent
Gurvich et al.

(10) Patent No.: US 12,649,579 B2
(45) Date of Patent: Jun. 9, 2026

(54) COMPOSITE BEAM FOR AIRCRAFT SEAT FRAME

(71) Applicant: B/E Aerospace, Inc., Winston-Salem, NC (US)

(72) Inventors: Mark R. Gurvich, Middletown, CT (US); Paolo Ballocchi, Newcastle (GB); David C. McConnell, Advance, NC (US); Rebecca R. Stoner, Lewisville, NC (US); Marc F. Pearce, Winston-Salem, NC (US)

(73) Assignee: B/E Aerospace Inc., Winston-Salem, NC (US)

( * ) Notice: Subject to any disclaimer, the term of this patent is extended or adjusted under 35 U.S.C. 154(b) by 147 days.

(21) Appl. No.: 18/429,869

(22) Filed: Feb. 1, 2024

(65) Prior Publication Data
US 2025/0250010 A1     Aug. 7, 2025

(51) Int. Cl.
*B64D 11/06*          (2006.01)

(52) U.S. Cl.
CPC ...... *B64D 11/0648* (2014.12); *B64D 11/0649* (2014.12)

(58) Field of Classification Search
CPC .... B64D 11/0648; B64D 11/0649; B60N 2/68
See application file for complete search history.

(56) References Cited

U.S. PATENT DOCUMENTS

| | | | |
|---|---|---|---|
| 4,312,162 A | | 1/1982 | Medney |
| 4,709,948 A | * | 12/1987 | Archer ............... B29C 66/5261 |
| | | | 156/304.3 |

| | | | |
|---|---|---|---|
| 7,300,112 B2 | 11/2007 | Johnson |
| 8,206,531 B2 | 6/2012 | Portoles |
| 8,506,015 B2 | 8/2013 | Le et al. |
| 10,124,899 B2 | 11/2018 | Mansouri et al. |
| 10,414,504 B2 | 9/2019 | Roderwald et al. |

(Continued)

FOREIGN PATENT DOCUMENTS

| | | |
|---|---|---|
| CN | 107380453 A | 11/2017 |
| EP | 3347272 B1 | 9/2020 |

(Continued)

OTHER PUBLICATIONS

European Patent Office, Extended European Search Report received in EP Application No. 25152106.8 Jun. 23, 2025, 10 pages.

(Continued)

*Primary Examiner* — Rodney A Bonnette
(74) *Attorney, Agent, or Firm* — Suiter Swantz IP

(57)          ABSTRACT

A composite support beam may be hollow, where the composite support beam includes an external fiber-reinforced polymer-matrix shell and one or more pultruded fiber-reinforced polymer-matrix composite parts. One or more walls of the external shell may define an internal cavity. The one or more pultruded parts may be arranged within the internal cavity defined by the one or more walls of the external shell. The one or more pultruded parts may be formed by a plurality of unidirectionally reinforced composites positioned in an axial direction of a respective hollow composite support beam. In some instances, the composite support beam may include an internal fiber-reinforced polymer-matrix shell.

15 Claims, 7 Drawing Sheets

(56) References Cited

U.S. PATENT DOCUMENTS

| | | | |
|---|---|---|---|
| 10,494,104 | B2 | 12/2019 | Jaeger et al. |
| 11,084,590 | B2 | 8/2021 | Le et al. |
| 11,110,836 | B2 | 9/2021 | Sulaiman et al. |
| 11,192,479 | B1 | 12/2021 | Brkovic et al. |
| 11,505,323 | B1 | 11/2022 | Parker et al. |
| 12,036,749 | B2 | 7/2024 | Gurvich |
| 12,145,731 | B2 | 11/2024 | Ballocchi et al. |
| 2003/0168897 | A1 | 9/2003 | Braun et al. |
| 2013/0307310 | A1 | 11/2013 | Saada et al. |
| 2014/0299722 | A1 | 10/2014 | Sampson |
| 2016/0003288 | A1 | 1/2016 | Richards |
| 2017/0240284 | A1 | 8/2017 | Portoles et al. |
| 2018/0281970 | A1 | 10/2018 | Hodgkinson |
| 2019/0276153 | A1 | 9/2019 | Tranier et al. |
| 2021/0001758 | A1 | 1/2021 | Sulaiman et al. |
| 2023/0046790 | A1 | 2/2023 | Lofgren et al. |

FOREIGN PATENT DOCUMENTS

| | | |
|---|---|---|
| FR | 2831228 B1 | 11/2004 |
| FR | 3124758 A1 | 1/2023 |
| GB | 494130 A | 10/1938 |
| KR | 20210067583 A | 6/2021 |

OTHER PUBLICATIONS

European Patent Office, Extended European Search Report received in EP Application No. 25154396.3, Apr. 14, 2025, 9 pages.
European Patent Office, European Examination Report for Application No. 25154396.3 dated Feb. 17, 2026, 6 pages.

\* cited by examiner

500

502 — FABRICATING AN INTERNAL SHELL

504 — FABRICATING ONE OR MORE PULTRUDED PARTS

506 — ASSEMBLING THE FABRICATED INTERNAL SHELL AND THE FABRICATED ONE OR MORE PULTRUDED PARTS TO FORM A FIRST ASSEMBLED PART OF THE COMPOSITE SUPPORT BEAM

508 — FABRICATING AN EXTERNAL SHELL WITH THE ASSEMBLY OF THE INTERNAL SHELL AND THE PULTRUDED PARTS

COMPOSITE BEAM FOR AIRCRAFT SEAT FRAME

TECHNICAL FIELD

The subject matter disclosed herein is related to the field of aircraft seats and, in particular, to a composite beam for an aircraft seat frame.

BACKGROUND

The build of the seat (and any included components within the build) may be required to meet guidelines and/or standards. For example, in select industries, the seat must be able to withstand inertial, dynamic, abuse, fatigue, and other load requirements as set forth by the industry guidelines and/or standards.

SUMMARY

A base assembly for an aircraft seat is disclosed, in accordance with one or more embodiments of the present disclosure. In embodiments, the base assembly includes one or more composite support beams, where the one or more composite support beams are hollow. In embodiments, each hollow composite support beam includes an external fiber-reinforced polymer-matrix shell, where one or more walls of the external fiber-reinforced polymer-matrix shell define an internal cavity. In embodiments, each hollow composite support beam includes one or more pultruded fiber-reinforced polymer-matrix composite parts, where the one or more pultruded fiber-reinforced polymer-matrix composite parts are arranged within the internal cavity defined by the one or more walls of the external fiber-reinforced polymer-matrix shell, where the one or more pultruded fiber-reinforced polymer-matrix composite parts are formed by a plurality of unidirectionally reinforced composites, where a fiber orientation of the one or more pultruded fiber-reinforced polymer-matrix composite parts is positioned in an axial direction of a respective hollow composite support beam.

In some embodiments, each hollow composite support beam may further include an internal fiber-reinforced polymer-matrix shell, where the one or more pultruded fiber-reinforced polymer-matrix composite parts are arranged between the one or more walls of the external fiber-reinforced polymer-matrix shell and one or more walls of the internal fiber-reinforced polymer-matrix shell, where the internal shell is arranged within an internal cavity defined by one or more surfaces of the one or more pultruded fiber-reinforced polymer-matrix composite parts.

In some embodiments, at least one of the one or more walls of the internal or the one or more walls of the external fiber-reinforced polymer-matrix shell may have a uniform thickness in a circumferential direction of the hollow composite support beam.

In some embodiments, at least one of the internal or external fiber-reinforced polymer-matrix shell may include a laminated composite layup.

In some embodiments, the external fiber-reinforced polymer-matrix shell may be at least one of rectangular or circular in cross-section, perpendicular to the axial direction of the one or more composite beams.

In some embodiments, the internal fiber-reinforced polymer-matrix shell may be one of rectangular, diamond shaped, or circular in cross-section, perpendicular to the axial direction of the one or more composite beams.

In some embodiments, the one or more pultruded fiber-reinforced polymer-matrix composite parts may include a first pultruded part is arranged in a transversal direction with respect to a beam axial direction.

In some embodiments, the one or more pultruded fiber-reinforced polymer-matrix composite parts may include a second pultruded part is arranged diametrically opposite to the first pultruded part and in the transversal direction with respect to the beam axial direction.

In some embodiments, the one or more pultruded fiber-reinforced polymer-matrix composite parts may include two sets of one or more pultruded fiber-reinforced polymer-matrix composite parts, where each set of the two or more sets includes the first pultruded part the second pultruded part, where a first set of the two or more sets is arranged orthogonal to a second set.

In some embodiments, the one or more fiber-reinforced polymer-matrix composite pultruded parts may be formed of at least one of a carbon-fiber unidirectionally reinforced composite material, a glass-fiber unidirectionally reinforced composite material, an organic-fiber unidirectionally reinforced composite material, a short-fiber reinforced composite material, or a polymeric material, wherein the polymer matrix is one of a thermoset or thermoplastic.

An aircraft seat is disclosed, in accordance with one or more embodiments of the present disclosure. In embodiments, the aircraft seat includes a seatback. In embodiments, the aircraft seat includes a seat pan. In embodiments, the aircraft seat includes a base assembly couplable to a floor of an aircraft cabin via one or more floor fittings. In embodiment, the base assembly includes one or more composite support beams, where the one or more composite support beams are hollow. In embodiments, each hollow composite support beam includes an external fiber-reinforced polymer-matrix shell, where one or more walls of the external fiber-reinforced polymer-matrix shell define an internal cavity. In embodiments, each hollow composite support beam includes one or more pultruded fiber-reinforced polymer-matrix composite parts, where the one or more pultruded fiber-reinforced polymer-matrix composite parts are arranged within the internal cavity defined by the one or more walls of the external fiber-reinforced polymer-matrix shell, where the one or more pultruded fiber-reinforced polymer-matrix composite parts are formed by a plurality of unidirectionally reinforced composites, where a fiber orientation of the one or more pultruded fiber-reinforced polymer-matrix composite parts positioned in an axial direction of a respective hollow composite support beam. In embodiments, the base assembly includes one or more spreaders configured to receive the one or more composite beams. In embodiments, the base assembly includes one or more leg assemblies, where the one or more leg assemblies are configured to be coupled to the one or more composite beams.

In some embodiments, each composite beam may further include an internal fiber-reinforced polymer-matrix shell, where the one or more pultruded fiber-reinforced polymer-matrix composite parts are arranged between the one or more walls of the external fiber-reinforced polymer-matrix shell and one or more walls of the internal fiber-reinforced polymer-matrix shell, where the internal fiber-reinforced polymer-matrix shell is arranged within an internal cavity defined by one or more surfaces of the one or more pultruded fiber-reinforced polymer-matrix composite parts.

In some embodiments, the one or more pultruded fiber-reinforced polymer-matrix composite parts may include a first pultruded part is arranged in a transversal direction with respect to a beam axial direction.

In some embodiments, the one or more pultruded fiber-reinforced polymer-matrix composite parts may include a second pultruded part is arranged in diametrically opposite to the first pultruded part and in the transversal direction with respect to the beam axial direction.

In some embodiments, the one or more pultruded parts may include two sets of one or more pultruded fiber-reinforced polymer-matrix composite parts, wherein each set of the two or more sets includes the first pultruded part the second pultruded part, wherein a first set of the two or more sets is arranged orthogonal to a second set.

In some embodiments, the one or more pultruded fiber-reinforced polymer-matrix composite parts may be formed of at least one of a carbon-fiber unidirectionally reinforced composite material, a glass-fiber unidirectionally reinforced composite material, an organic-fiber unidirectionally reinforced composite material, a short-fiber reinforced composite material, or a polymeric material, wherein polymer matrix includes one of a thermoset or thermoplastic.

A method of manufacturing a hollow composite support beam is disclosed, in accordance with one or more embodiments of the present disclosure. In embodiments, the method includes fabricating an internal fiber-reinforced polymer-matrix shell In embodiments, the method includes fabricating one or more pultruded fiber-reinforced polymer-matrix composite parts, where the one or more pultruded fiber-reinforced polymer-matrix composite parts are formed by a plurality of unidirectionally reinforced composites, where a fiber orientation of the one or more pultruded fiber-reinforced polymer-matrix composite parts in an axial direction of a respective hollow composite support beam. In embodiments, the method includes assembling the fabricated internal fiber-reinforced polymer-matrix shell and the fabricated one or more pultruded fiber-reinforced polymer-matrix composite parts to form a first assembled part of the hollow composite support beam. In embodiments, the method includes fabricating an external fiber-reinforced polymer-matrix shell. In embodiments, the method includes fabricating the hollow composite support beam by applying the external fiber-reinforced polymer-matrix on a top surface of the first assembled part.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1A:
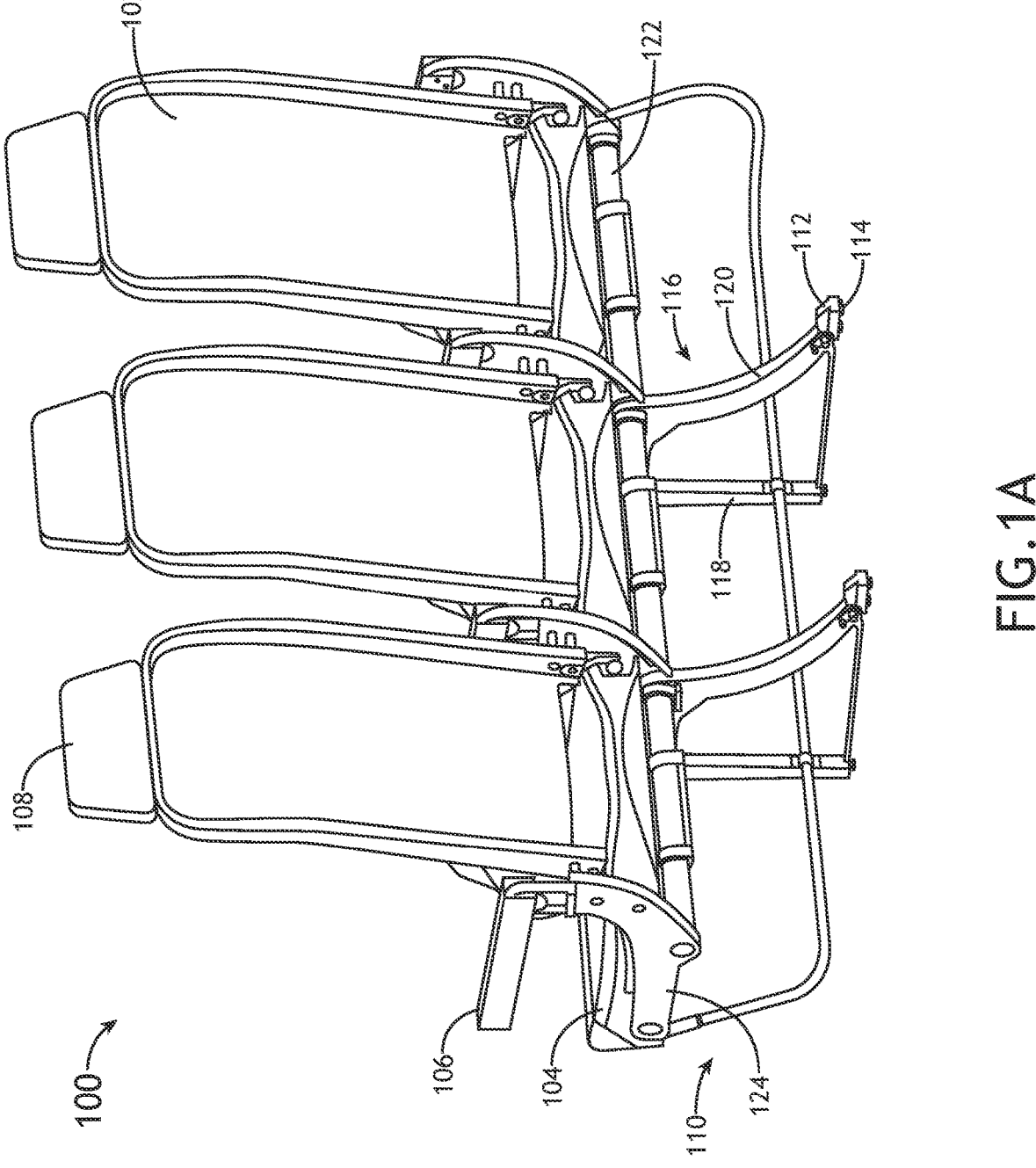
FIG. 1A is a simplified schematic perspective view of an aircraft seat, in accordance with one or more embodiments of the present disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following:

A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one," "one or more," or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

Seats may include components such as, but not limited to, a seatback, a seat pan, and a base assembly (e.g., a primary structure). In select industries the build of the seat (and any included components within the build) may be required to meet guidelines and/or standards. For example, aircraft seats may be required to meet aviation guidelines and/or standards. For instance, the select aircraft seats may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), or any other standards setting organization or company; or any other guidelines agency or organization; or the like. The base assembly may present difficulties such as, but not limited to, failing to meet load requirements (e.g., abuse, reliability, and dynamic load requirements (e.g., 4G lateral and 16 g FWD load requirements)), or the like as set forth by the FAA in 14 C.F.R. Part 25, Airworthiness Standards: Transport Category Airplanes)).

Metal alloys (e.g., aluminum and mild steel) are conventionally used in the build of aircraft seats and deliver both strength and ductility, however, metal alloys increase the cost and weight of the aircraft seat and it is often desirable to reduce the cost and weight of the seat.

As such, it would be desirable to provide an aircraft seat base assembly configured to address one or more shortcomings of the previous approaches. The aircraft seat base assembly includes a composite structural beam, where the composite structural beam includes an external composite shell and at least one or more pultruded sections formed of unidirectional fiber-reinforced composite material. In some embodiments, the composite structural beam includes an internal composite shell. The assembly should be configured in accordance with aviation guidelines and/or standards. For example, the assembly should meet load requirements (e.g., abuse, reliability, and dynamic load requirements (e.g., 4G lateral and 16 g FWD load requirements)). Further, the assembly should have high energy absorption capabilities and meet ductility requirements. The assembly should reduce the cost and weight of the seat.

FIGS. 1A-6 in general illustrate an aircraft seat base assembly for an aircraft seat and a method of manufacture, in accordance with one or more embodiments of the disclosure.

Figure 1B:
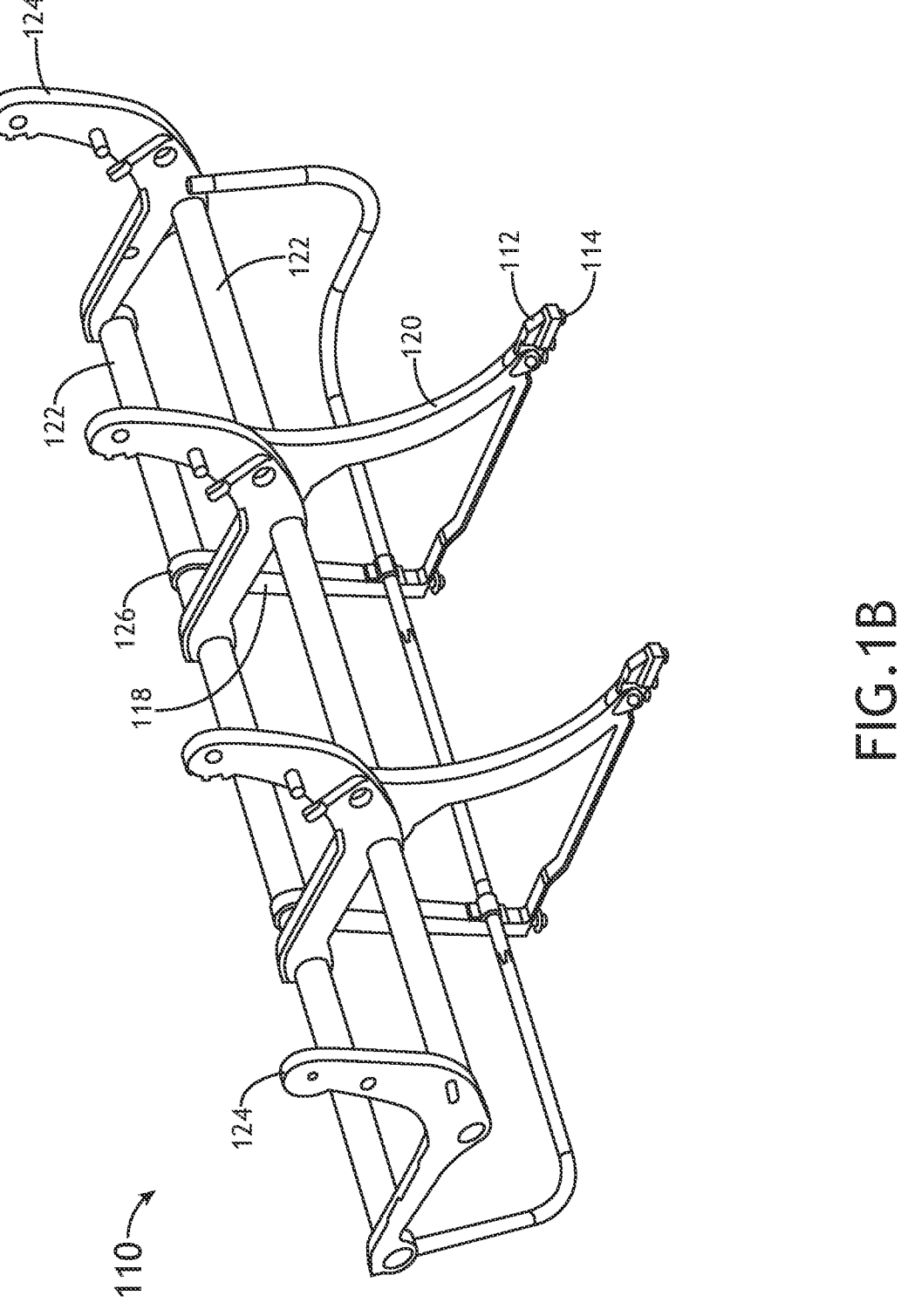
FIG. 1B is a simplified schematic perspective view of a frame base assembly of an aircraft seat, in accordance with one or more embodiments of the present disclosure.

Referring in general to FIGS. 1A-1B, a base assembly may be integrated within an aircraft seat 100 installed within an aircraft cabin. For example, the one or more base assemblies may be integrated within a row of aircraft seats 100 installed within an aircraft cabin. By way of another example, the one or more base assemblies may be integrated within an individual aircraft seat 100 installed within an aircraft cabin. It is noted that FIGS. 1A-1B are provided merely for illustrative purposes and shall not be construed as limiting the scope of the present disclosure.

The aircraft seat 100 may include, but is not limited to, a business class or first-class passenger seat, an economy-class passenger seat, a crew member seat, or the like. It is noted the terms "aircraft seats" and "passenger seats" may be considered equivalent, for purposes of the disclosure.

The aircraft seat 100 may be rotatable about an axis (e.g., swivelable). The aircraft seat 100 may be fully positionable between the outer limits of motion as defined by the moveable components of the aircraft seat 100. Where the aircraft seat 100 is installed within a passenger compartment, the aircraft seat 100 may be fully positionable between the outer limits of motion as defined by one or more passenger compartment monuments of the passenger compartment. It is noted an upright or raised position may be considered a taxi, takeoff, or landing (TTL) position during select stages of flight (though the upright or raised position is not limited to use during the select stages of flight as the TTL position, but also may be used at any point during the flight), for purposes of the present disclosure. In addition, it is noted that any position that does not meet the above-defined requirements of the TTL position may be considered a non-TTL position, for purposes of the present disclosure. Further, it is noted the aircraft seat 100 may be actuatable (e.g., translatable and/or rotatable) from the TTL position to a non-TTL position, and/or vice versa. Further, it is noted the aircraft seat 100 may be capable of a fully upright or raised position, and that the TTL position may have a more reclined seatback cushion and a more angled upward seat pan cushion as compared to the fully upright or raised position. Therefore, the above description should not be interpreted as a limitation on the present disclosure but merely an illustration.

In general, an aircraft seat 100 may be translatable (e.g., trackable or slidable). The aircraft seat 100 may be rotatable about an axis cross-wise through the aircraft seat 100 into a position including, but not limited to, the upright or raised position, one or more lounge or reclined positions, and a lie-flat or bed position. For example, the aircraft seat 100 may transition directly between the upright or raised position and the lie-flat or bed position. By way of another example, it is noted the aircraft seat 100 may transition through one or more lounge or reclined positions between the upright or raised position and the lie-flat or bed position. By way of another example, the aircraft seat 100 may transition into one or more lounge or reclined positions in a motion separate from the transition between the upright or raised position and the lie-flat or bed position. Therefore, the above description should not be interpreted as a limitation on the scope of the disclosure but merely an illustration.

The aircraft seat 100 may include a seatback 102. The aircraft seat 100 may include a seat pan 104. The aircraft seat 100 may include one or more arms 106.

The seatback 102 may include a headrest 108. For example, the headrest 108 may be integrated within the seatback 102. By way of another example, the headrest 108 may be a separate component coupled to (or inserted into) the seatback 102. For instance, the headrest 108 may be movable relative to the seatback frame of the aircraft seat 100 (e.g., adjustable, removable, or the like).

The aircraft seat 100 may be coupled to a frame base assembly 110. For example, the seat frame of the aircraft seat 100 may be couplable to the base assembly 110. The base assembly 110 may be couplable to a floor of an aircraft cabin. For example, the base assembly 110 may be couplable to a floor of an aircraft cabin via one or more tracks (not shown), one or more track covers 112, and/or one or more floor fittings 114 (or track fasteners 114).

The base assembly 110 may include one or more leg sub-assemblies 116. Each leg sub-assembly 116 may include one or more legs. For example, each leg sub-assembly 116 may include a front leg 118 and a rear leg 120.

The one or more legs may be couplable to one or more portions of the seat frame of the aircraft seat 100. For example, the one or more front legs 118 may be couplable to a front portion of the seat frame of the aircraft seat 100. By way of another example, the one or more rear legs 120 may be couplable to a rear portion of the seat frame of the aircraft seat 100.

Referring to FIG. 1B, the one or more legs may be couplable to one or more composite support beams 122 and/or one or more spreaders 124. For example, the one or more front legs 118 may be couplable to a front beam of the one or more beams 122 and a front portion of the one or more spreaders 124 (e.g., a front opening). By way of another example, the one or more rear legs 120 may be couplable to a rear beam of the one or more beams 122 and a rear portion of the one or more spreaders 124 (e.g., a rear opening). In this regard, the one or more legs 118, 120 may be configured to attach to the one or more composite support beams 122 via one or more joints 126 and secure to the one or more tracks located in the floor of the aircraft cabin via the one or more fittings 114.

Joints for composite beams are generally discussed in U.S. patent application Ser. No. 18/430,359, filed on Feb. 1, 2024, which is incorporated herein by reference in the entirety.

FIGS. 2A-4C illustrate the composite support beam 122, in accordance with one or more embodiments of the present disclosure.

The composite support beam 122 may be hollow. In this regard, the hollow cavity of the composite support beam 122 may be configured to receive one or more components. For example, the composite support beam 122 may be configured one or more electronic packages or electronic wires/cables.

The composite support beam 122 includes an external shell 200. The external shell 200 may include an external fiber-reinforced polymer-matrix shell. For example, the external fiber-reinforced polymer-matrix shell may be a laminated shell on an external surface of the composite support beam 122, where the laminated shell is formed of a laminated composite layup. For instance, the laminated shell of the external shell 200 may have a uniform layup in a circumferential direction. Representative layups may include, as examples, laminated designs ±α, 0, 90 deg or any of their combinations, where a is the orientation with respect to the axial direction of the beam (i.e., 0 orientation). Similarly, for instance, one or more walls of the external shell may have a uniform thickness in the circumferential direction of the structural beam 122.

The external shell 200 may be formed of a fiber-reinforced polymer-matrix composite material such as, but not limited to, carbon fibers, glass fibers, organic fibers (e.g., Kevlar), thermoset polymeric matrix, thermoplastic polymeric matrix, or the like.

It is contemplated that the external shell 200 may be fabricated using any suitable fabrication process such as, but not limited to, filament-winding, automated fiber placement (AFP), wrapping, or the like.

In some embodiments, the external shell 200 may be circular. For example, as shown in FIGS. 2A-2B and 4A-4C, the external shell 200 may a 360-degree circle, such that the external shell 200 is considered axi-symmetrical.

Figures 3A, 3B, 3C:
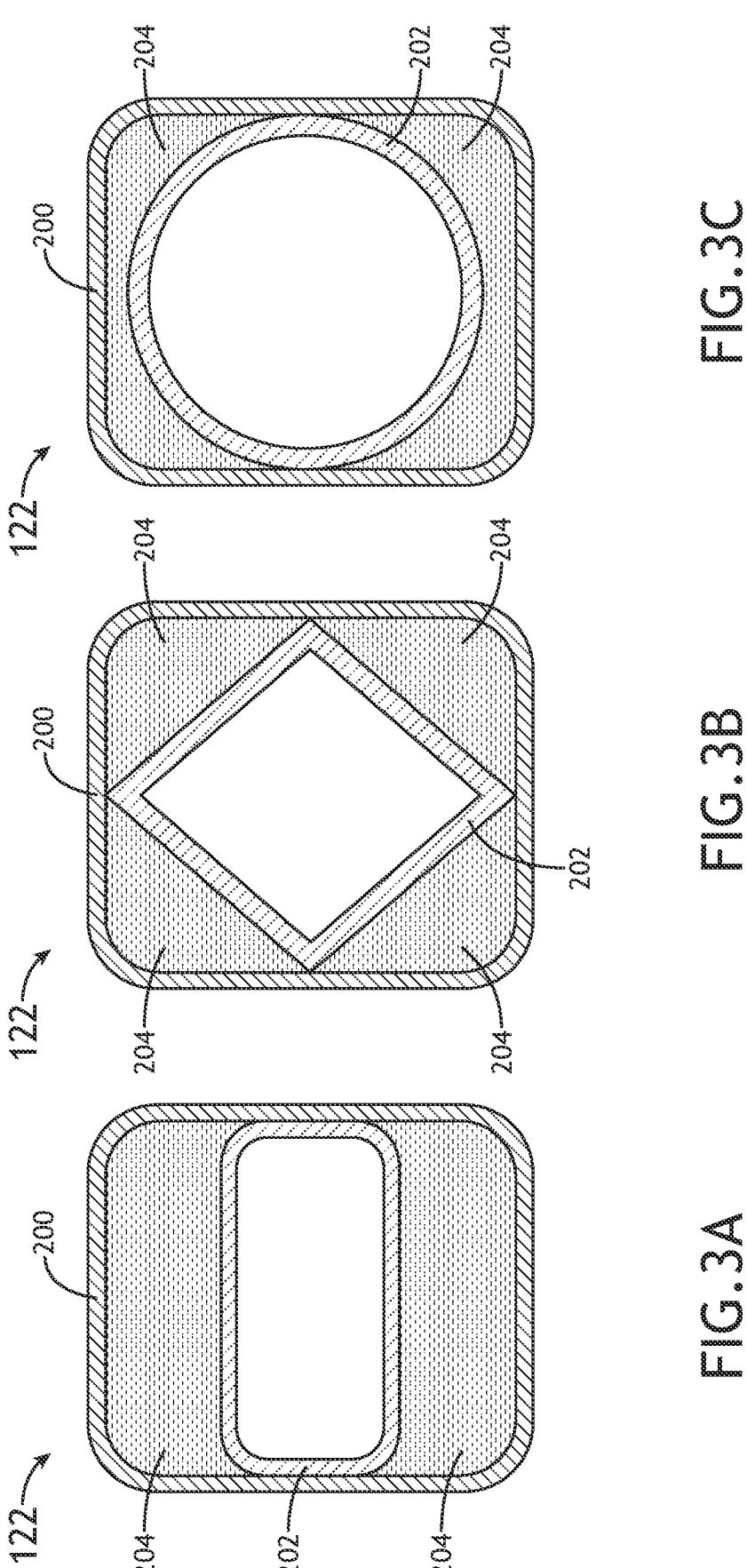
FIG. 3A is a simplified cross-sectional view of a composite beam, in accordance with one or more embodiments of the present disclosure.
FIG. 3B is a simplified cross-sectional view of a composite beam, in accordance with one or more embodiments of the present disclosure.
FIG. 3C is a simplified cross-sectional view of a composite beam, in accordance with one or more embodiments of the present disclosure.

In some embodiments, the external shell 200 may be non-circular. For example, as shown in FIGS. 3A-3C, the external shell 200 may be semi-rectangular (e.g., rectangular with curved corners/edges).

In some embodiments, the composite support beam 122 includes an internal shell 202. The internal shell 202 may include an internal fiber-reinforced polymer-matrix shell 202. For example, as shown in FIGS. 2A-3C, the composite support beam 122 may include an internal shell 202 within a cavity defined by one or more walls of the external shell 200. The internal fiber-reinforced polymer-matrix shell 202 may include a laminated shell on the interior surface of the structural beam 122, where the laminated shell is formed of a laminated composite layup. For example, the laminated shell of the internal shell 202 may have a uniform layup in a circumferential direction. Representative layups may include, as examples, laminated designs (e.g., with layup ±β), 0, 90 deg or any of their combinations, where β is the orientation with respect to the axial direction of the beam (i.e., 0 orientation). Similarly, for instance, one or more walls of the internal shell 202 may have a uniform thickness in the circumferential direction of the structural beam 122.

The internal shell 202 may be formed of a fiber-reinforced polymer-matrix composite material such as, but not limited to, carbon fibers, glass fibers, organic fibers (e.g., synthetic (such as aramid, e.g., Kevlar) or natural (such as hemp or flax)), thermoset polymeric matrix, thermoplastic polymeric matrix, or the like.

In some embodiments, the internal shell 202 may be non-circular. In this regard, the cross-section of the structural beam 122 may be considered non-axi-symmetric. For instance, the internal shell 202 may have two or more parallel surfaces.

Figures 2A, 2B:
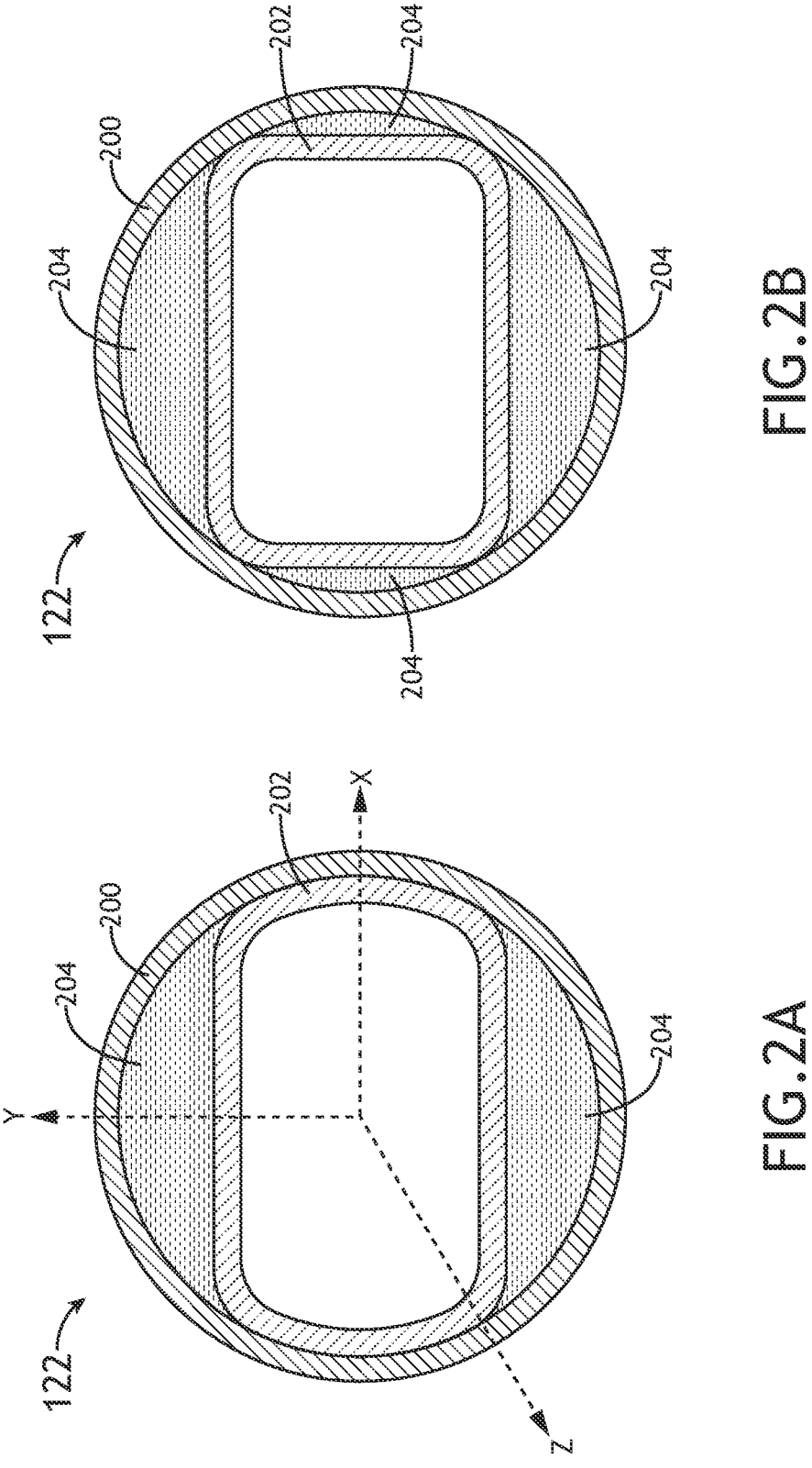
FIG. 2A is a simplified cross-sectional view of a composite beam, in accordance with one or more embodiments of the present disclosure.
FIG. 2B is a simplified cross-sectional view of a composite beam, in accordance with one or more embodiments of the present disclosure.

For example, as shown in FIGS. 2A-2B and 3A, the internal shell 202 may be at least semi-rectangular. In one instance, as shown in FIG. 2A, the internal shell 202 may have two substantially straight edges and two rounded edges forming the semi-rectangular internal shell 202. In another instance, as shown in FIGS. 2B and 2A, the internal shell 202 may have fourth substantially straight edges with rounded corners forming the semi-rectangular internal shell 202. By way of another example, as shown in FIG. 3B, the internal shell 202 is diamond shaped.

The composite support beam 122 includes one or more pultruded parts 204. For example, the one or more pultruded parts 204 may provide unidirectional (i.e., single direction) reinforcement in the z-direction, i.e., in orientation parallel to the axial direction of the considered beam. For instance, the one or more pultruded parts 204 may be formed by a plurality of unidirectionally reinforced composites positioned in an axial direction of a respective beam 122.

The one or more pultruded parts 204 may be formed of any suitable material for providing unidirectional reinforcement in the z-direction. For example, the one or more pultruded parts 204 may be formed of carbon fiber unidirectionally reinforced composites. By way of another example, the one or more pultruded parts 204 may be formed of glass fiber unidirectionally reinforced composites. By way of another example, the one or more pultruded parts 204 may be formed of organic fiber unidirectionally reinforced composites (e.g., synthetic like aramid (e.g., Kevlar), natural (e.g., hemp and flax), or the like). By way of another example, the one or more pultruded parts 204 may be formed of composites reinforced by short fibers.

The polymer matrix may be formed of one of a thermoset or a thermoplastic.

In some embodiments, the one or more pultruded parts 204 may be arranged between the external shell 200 and the internal shell 202. For example, as shown in FIGS. 2A-3C, the internal cavity defined by the one or more walls of the external shell 200 may include the one or more pultruded parts 204, where an internal cavity defined by one or more surfaces of the one or more pultruded parts 204 may be arranged proximate to the internal shell 202.

Figures 4A, 4B, 4C:
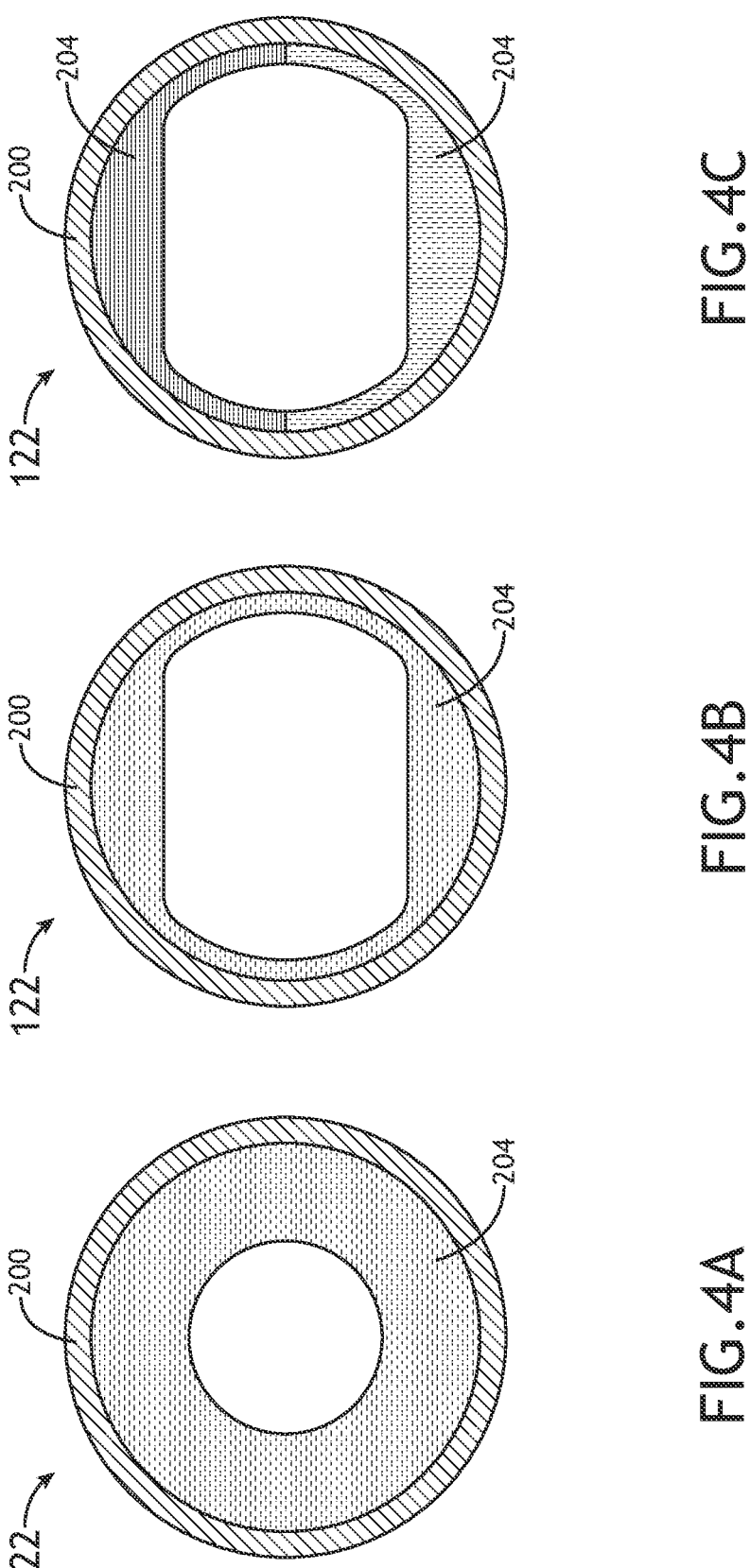
FIG. 4A is a simplified cross-sectional view of a composite beam, in accordance with one or more embodiments of the present disclosure.
FIG. 4B is a simplified cross-sectional view of a composite beam, in accordance with one or more embodiments of the present disclosure.
FIG. 4C is a simplified cross-sectional view of a composite beam, in accordance with one or more embodiments of the present disclosure.

In some embodiments, the composite support beam 122 does not include the internal shell 202. For example, as shown in FIGS. 4A-4C, the internal cavity defined by the one or more walls of the external shell 200 may include the one or more pultruded parts 204. In this regard, the one or more pultruded parts 204 may be arranged on an interior surface of the external shell 200.

Referring to FIGS. 4A-4B, the one or more pultruded parts 204 may include a single pultruded part. For example, as shown in FIG. 4A, the external shell 200 of the support beam 122 may be circular with a pultruded axi-symmetric core (i.e. circular) and wrapped composite. By way of another example, as shown in FIG. 4B, the external shell 200 of the support beam 122 may be circular with a pultruded non-axi-symmetric core (i.e., non-circular) and wrapped composite.

Referring to FIG. 4C, the one or more pultruded parts 204 include a plurality of pultruded parts (i.e., two or more pultruded parts). For example, the plurality of pultruded parts may include at least a first pultruded part arranged in a transversal direction with respect to a beam axial direction and at least a second pultruded part arranged in the transversal direction with respect to the beam axial direction. For instance, as shown in FIG. 4C, the external shell 200 may be circular with a multi-piece pultruded core formed of the at least first and second pultruded parts. It is contemplated that the plurality of pultruded parts may be coupled together via any applicable fabrication method such as, but not limited to, adhesives (e.g., glue), a co-cured process, or the like.

In some embodiments, as shown in FIG. 2A, the one or more pultruded parts 204 provide dominant bending stiffness in the y-direction. For example, a first pultruded part may be arranged in a first portion of the internal cavity and a second pultruded part may be arranged in a second portion of the internal cavity. For instance, the first portion may be along the y-direction of the internal cavity and the second portion may be along the y-direction of the internal cavity, opposite the first, such that bending stiffness is dominant along the y-direction.

In some embodiments, as shown in FIG. 2B, the one or more pultruded parts 204 provide dominant bending stiffness in the x- and y-direction. For example, a first pultruded section may be arranged in a first portion of the internal cavity, a second pultruded part may be arranged in a second portion of the internal cavity, a third pultruded part may be arranged in a third portion of the internal cavity, and a fourth part section may be arranged in a fourth portion of the internal cavity. For instance, the first portion may be along the y-direction of the internal cavity and the second portion may be along the y-direction of the internal cavity, such that bending stiffness is dominant along the y-direction. Further, the third portion may be along the x-direction of the internal cavity and the fourth portion may be along the x-direction of the internal cavity, such that bending stiffness is dominant along the x-direction. In this regard, the pultruded parts collectively, provide dominate bending stiffness in the x- and y-direction. As such, there is an optimized ratio between bending stiffness and/or strength in the x- and y-directions.

Figure 5:
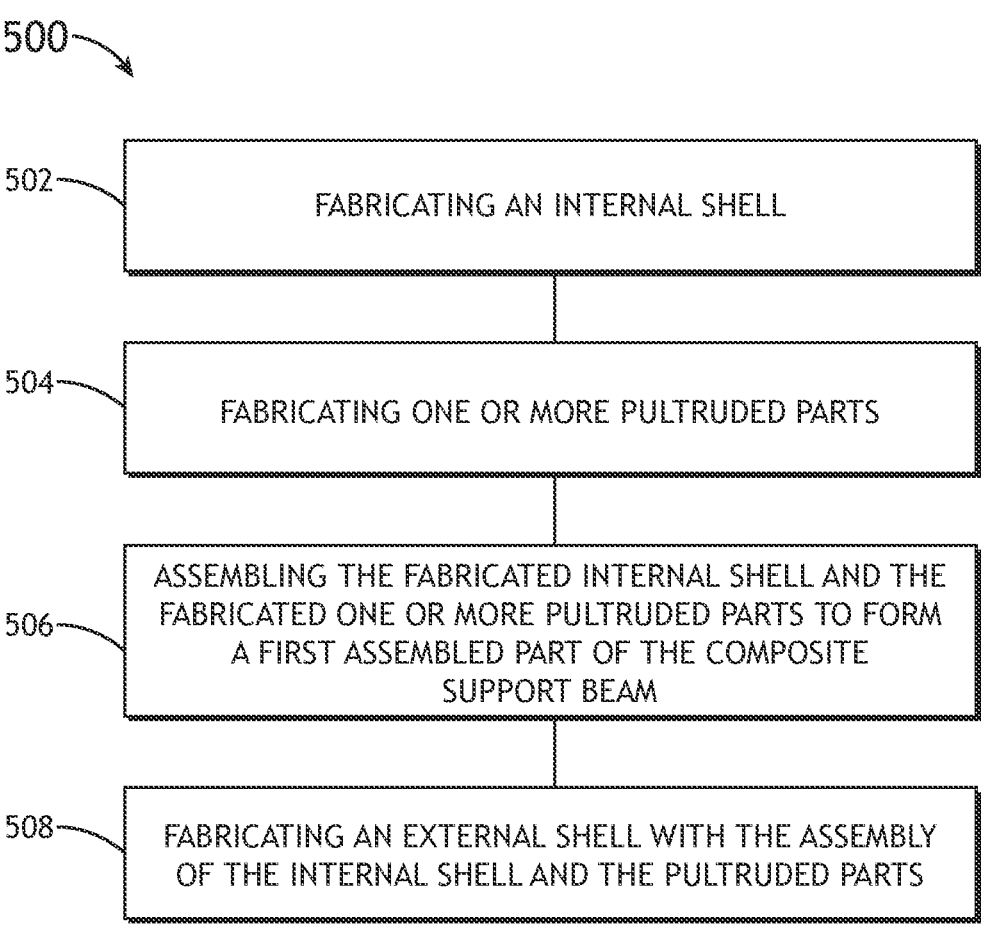
FIG. 5 is a flowchart depicting a method or process for manufacturing a composite beam of the present disclosure, in accordance with one or more embodiments of the present disclosure.
Figure 6:
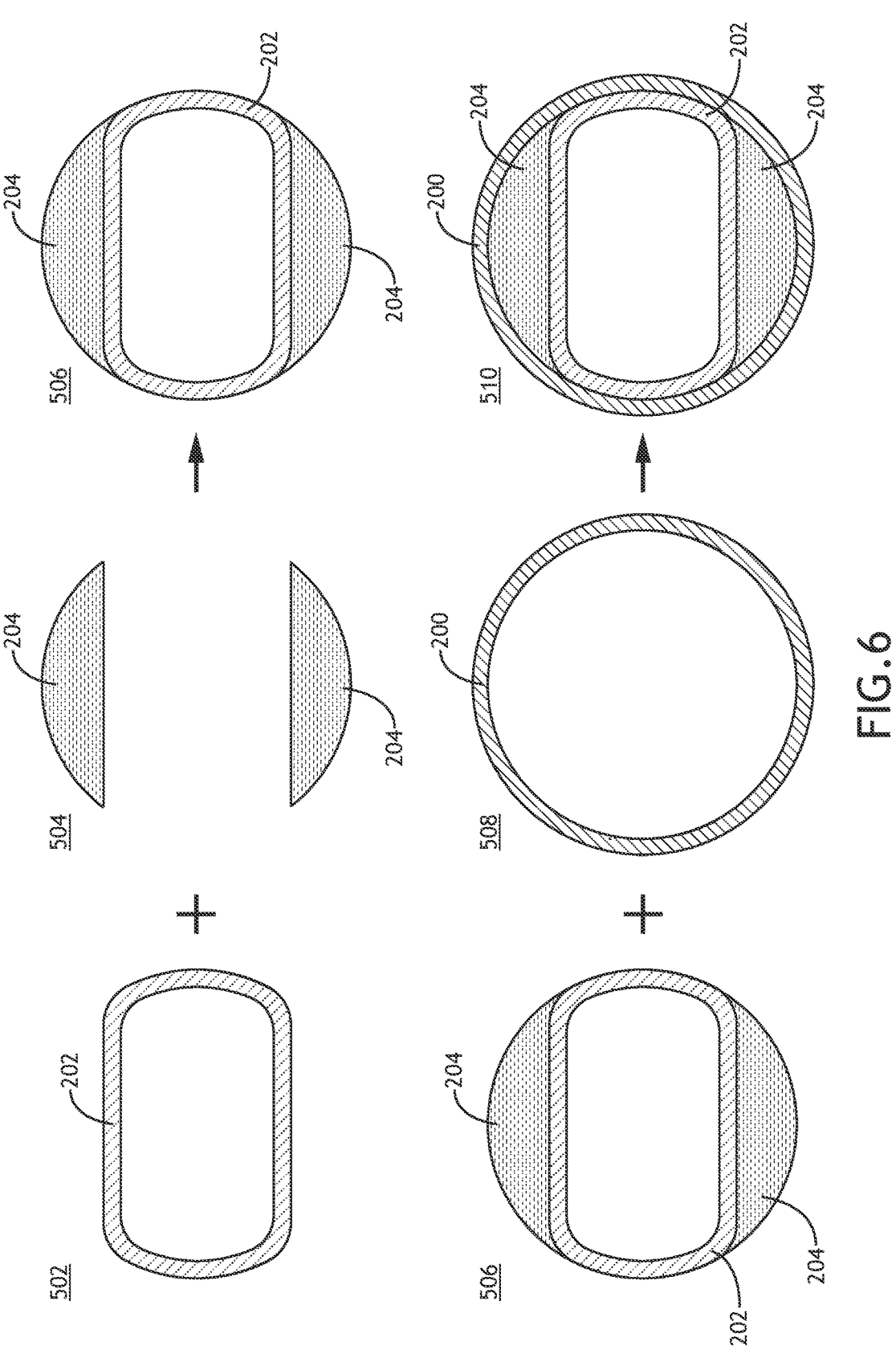
FIG. 6 is a simplified schematic depicting the method or process for manufacturing a composite beam of the present disclosure, in accordance with one or more embodiments of the present disclosure.

FIGS. 5-6 depict a method or process 500 for manufacturing the composite support beam 122, in accordance with one or more embodiments of the present disclosure.

In a step 502, an internal shell is fabricated. For example, the internal shell 202 may be fabricated using a filament-winding process. By way of other examples, the internal shell 202 may be fabricated using an Automated Fiber Placement (AFP) process or a wrapping technique.

In a step 504, one or more pultruded parts are fabricated. For example, the one or more pultruded parts 204 may be fabricated with unidirectional reinforcement with oriented composite fibers in the z-direction. The one or more pultruded parts 204 may be fabricated using any applicable pultrusion process.

In a step 506, the internal shell and the one or more pultruded parts (fabricated in steps 502, 504, respectively) are assembled together.

In a step 508, an external shell is fabricated and, at the same time, positioned on the external surface of the assembly of the internal shell and the pultruded parts. For example, the external shell 200 may be fabricated using a filament-winding process. By way of another example, the external shell 200 may be fabricated using an Automated Fiber Placement (AFP) process. Another example of fabrication may be a wrapping technique.

The assembly of the internal shell and the one or more pultruded parts assembly (assembled in step 506) are assembled with the external shell during fabrication of the external shell. For example, the external shell 200 may be placed around a profile of the internal shell and pultruded parts via filament-winding or AFP.

In a case of thermoset composite materials, the fabricated final assembly of the external shell, optionally internal shell, and pultruded parts may be cured, similarly to other thermoset composite structures. The post-cured thermoset beam will then demonstrate desired stiffness and strength. In a case of thermoplastic composite materials, the fabricated composite beam will be solidified upon return to the ambient, i.e., room temperature. It will similarly provide desired stiffness and strength. Finally, the metallic mandrel shall be removed from a fully fabricated either cured or solidified composite beam. The mandrel removal may be performed, for example, by applying axial load as usually done with AFP-fabricated tubes.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A base assembly for an aircraft seat, the base assembly comprising:
  one or more composite support beams, wherein the one or more composite support beams are hollow, wherein each of the hollow composite support beam comprises:
    an external fiber-reinforced polymer-matrix shell, wherein one or more walls of the external fiber-reinforced polymer-matrix shell define an internal cavity;
    one or more pultruded fiber-reinforced polymer-matrix composite parts, wherein the one or more pultruded fiber-reinforced polymer-matrix composite parts are arranged within the internal cavity defined by the one or more walls of the external fiber-reinforced polymer-matrix shell, wherein the one or more pultruded fiber-reinforced polymer-matrix composite parts are formed by a plurality of unidirectionally reinforced composites, wherein a fiber orientation of the one or more pultruded fiber-reinforced polymer-matrix composite parts is positioned in an axial direction of a respective hollow composite support beam; and
    an internal fiber-reinforced polymer-matrix shell, wherein the one or more pultruded fiber-reinforced polymer-matrix composite parts are arranged between the one or more walls of the external fiber-reinforced polymer-matrix shell and one or more walls of the internal fiber-reinforced polymer-matrix shell, wherein the internal shell is arranged within an internal cavity defined by one or more surfaces of the one or more pultruded fiber-reinforced polymer-matrix composite parts.

2. The assembly of claim 1, wherein at least one of the one or more walls of the internal or the one or more walls of the external fiber-reinforced polymer-matrix shell have a uniform thickness in a circumferential direction of the hollow composite support beam.

3. The assembly of claim 1, wherein at least one of the internal or external fiber-reinforced polymer-matrix shell includes a laminated composite layup.

4. The assembly of claim 1, wherein the external fiber-reinforced polymer-matrix shell is at least one of:
  rectangular or circular in cross-section, perpendicular to the axial direction of the one or more composite beams.

5. The assembly of claim 4, wherein the internal fiber-reinforced polymer-matrix shell is one of:
  rectangular, diamond shaped, or circular in cross-section, perpendicular to the axial direction of the one or more composite beams.

6. The assembly of claim 1, wherein the one or more pultruded fiber-reinforced polymer-matrix composite parts comprise:
  a first pultruded part is arranged in a transversal direction with respect to a beam axial direction.

7. The assembly of claim 6, wherein the one or more pultruded fiber-reinforced polymer-matrix composite parts comprise:
  a second pultruded part is arranged diametrically opposite to the first pultruded part and in the transversal direction with respect to the beam axial direction.

8. The assembly of claim 7, wherein the one or more pultruded fiber-reinforced polymer-matrix composite parts comprise:
  two sets of one or more pultruded fiber-reinforced polymer-matrix composite parts, wherein each set of the two or more sets includes the first pultruded part the second pultruded part, wherein a first set of the two or more sets is arranged orthogonal to a second set.

9. The assembly of claim 1, wherein the one or more fiber-reinforced polymer-matrix composite pultruded parts are formed of at least one of:
  a carbon-fiber unidirectionally reinforced composite material, a glass-fiber unidirectionally reinforced composite material, an organic-fiber unidirectionally reinforced composite material, a short-fiber reinforced composite material, or a polymeric material,
  wherein the polymer-matrix is one of a thermoset or thermoplastic.

10. An aircraft seat, the aircraft seat comprising:
  a seatback;
  a seat pan; and
  a base assembly couplable to a floor of an aircraft cabin via one or more floor fittings, the base assembly comprising:
    one or more composite support beams, wherein the one or more composite support beams are hollow, wherein each of the hollow composite support beam comprises:
      an external fiber-reinforced polymer-matrix shell, wherein one or more walls of the external fiber-reinforced polymer-matrix shell define an internal cavity;
      one or more pultruded fiber-reinforced polymer-matrix composite parts, wherein the one or more pultruded fiber-reinforced polymer-matrix composite parts are arranged within the internal cavity defined by the one or more walls of the external fiber-reinforced polymer-matrix shell, wherein the one or more pultruded fiber-reinforced polymer-matrix composite parts are formed by a plurality of unidirectionally reinforced composites, wherein a fiber orientation of the one or more pultruded fiber-reinforced polymer-matrix composite parts positioned in an axial direction of a respective hollow composite support beam; and
      an internal fiber-reinforced polymer-matrix shell, wherein the one or more pultruded fiber-reinforced polymer-matrix composite parts are arranged between the one or more walls of the external fiber-reinforced polymer-matrix shell and one or more walls of the internal fiber-reinforced polymer-matrix shell, wherein the internal fiber-reinforced polymer-matrix shell is arranged within an internal cavity defined by one or more surfaces of the one or more pultruded fiber-reinforced polymer-matrix composite parts;
    one or more spreaders configured to receive the one or more composite beams; and
    one or more leg assemblies, wherein the one or more leg assemblies are configured to be coupled to the one or more composite beams.

11. The aircraft seat of claim 10, wherein the one or more pultruded fiber-reinforced polymer-matrix composite parts comprise:
  a first pultruded part is arranged in a transversal direction with respect to a beam axial direction.

12. The aircraft seat of claim 11, wherein the one or more pultruded fiber-reinforced polymer-matrix composite parts comprise:
  a second pultruded part is arranged in diametrically opposite to the first pultruded part and in the transversal direction with respect to the beam axial direction.

13. The aircraft seat of claim 10, wherein the one or more pultruded parts comprise:

two sets of one or more pultruded fiber-reinforced poly-mer-matrix composite parts, wherein each set of the two or more sets includes a first pultruded part and a second pultruded part, wherein a first set of the two or more sets is arranged orthogonal to a second set.

14. The aircraft seat of claim 10, wherein the one or more pultruded fiber-reinforced polymer-matrix composite parts are formed of at least one of:

a carbon-fiber unidirectionally reinforced composite material, a glass-fiber unidirectionally reinforced com-posite material, an organic-fiber unidirectionally rein-forced composite material, a short-fiber reinforced composite material, or a polymeric material, wherein polymer matrix includes one of a thermoset or thermoplastic.

15. A method of manufacturing a hollow composite support beam comprising:

fabricating an internal fiber-reinforced polymer-matrix shell;

fabricating one or more pultruded fiber-reinforced poly-mer-matrix composite parts, wherein the one or more pultruded fiber-reinforced polymer-matrix composite parts are formed by a plurality of unidirectionally reinforced composites, wherein a fiber orientation of the one or more pultruded fiber-reinforced polymer-matrix composite parts in an axial direction of a respec-tive hollow composite support beam;

assembling the fabricated internal fiber-reinforced poly-mer-matrix shell and the fabricated one or more pul-truded fiber-reinforced polymer-matrix composite parts to form a first assembled part of the hollow composite support beam;

fabricating an external fiber-reinforced polymer-matrix shell; and fabricating the hollow composite support beam by apply-ing the external fiber-reinforced polymer-matrix on a top surface of the first assembled part.

* * * * *